United States Patent
Huber et al.

(10) Patent No.: US 11,394,626 B2
(45) Date of Patent: Jul. 19, 2022

(54) DIGITAL SERVICES FRAMEWORK

(71) Applicant: SAP SE, Walldorf (DE)

(72) Inventors: Daniel Huber, Walzbachtal (DE);
Srikanth Grandhe, Bangalore (IN);
Emese Borbala Baliko, Budapest
(HU); Sri Vidah A N, Bangalore (IN);
Yogesh Beria, Purulia (IN); **Anubhav
Bhatia, Sunnyvale, CA (US); Lukas
Carullo, Menlo Park, CA (US); Martin
Weiss, Menlo Park, CA (US); Patrick
Brose**, San Francisco, CA (US);
Markus Krabel, Plankstadt (DE)

(73) Assignee: SAP SE, Walldorf (DE)

(*) Notice: Subject to any disclaimer, the term of this patent is extended or adjusted under 35 U.S.C. 154(b) by 0 days.

(21) Appl. No.: 16/211,719

(22) Filed: Dec. 6, 2018

(65) Prior Publication Data

US 2020/0186444 A1    Jun. 11, 2020

(51) Int. Cl.

| | |
|---|---|
| *H04L 29/08* | (2006.01) |
| *H04L 12/24* | (2006.01) |
| *H04L 29/06* | (2006.01) |
| *H04L 41/5054* | (2022.01) |
| *H04L 41/5051* | (2022.01) |
| *H04L 41/50* | (2022.01) |
| *H04L 67/00* | (2022.01) |

(Continued)

(52) U.S. Cl.
CPC ........ *H04L 41/5054* (2013.01); *H04L 41/509* (2013.01); *H04L 41/5051* (2013.01); *H04L 65/1063* (2013.01); *H04L 65/1089* (2013.01); *H04L 65/4084* (2013.01); *H04L 67/32* (2013.01); *H04L 67/34* (2013.01)

(58) Field of Classification Search
CPC ............ H04L 41/5054; H04L 41/5051; H04L 41/509; H04L 65/1063; H04L 65/1089; H04L 65/4084; H04L 67/32; H04L 67/34
See application file for complete search history.

(56) References Cited

U.S. PATENT DOCUMENTS 7,409,208 B1    8/2008    Clare et al.
10,135,940 B2 *  11/2018    Kaledhonkar .......... H04L 67/26
(Continued)

FOREIGN PATENT DOCUMENTS

WO    WO-2005106666 A1 *  11/2005    ............... G06F 8/61

*Primary Examiner* — Uzma Alam
(74) *Attorney, Agent, or Firm* — Fountainhead Law Group P.C.

(57) ABSTRACT

A selection indicative of one or more types of information associated with a product or service is received by a computing device of a digital services framework. A data container is generated for a content package comprising one or more semantics for populating the content package with the selected types of information. Based on the product or service, one or more recipients for the content package are identified. An announcement indicative of the content package is sent to the identified recipients. Requests for subscriptions to the content package identified recipients are received. Instances of the container are populated for identified recipients who have subscribed to the content package. The populating comprises populating the content package with the selected types of information based on the one or more semantics. The populated instances of the content package are sent to the subscribed recipients.

18 Claims, 11 Drawing Sheets

(51) Int. Cl.
*H04L 65/1089* (2022.01)
*H04L 65/612* (2022.01)
*H04L 67/60* (2022.01)
*H04L 65/1063* (2022.01)

(56) References Cited

U.S. PATENT DOCUMENTS

| | | | |
|---|---|---|---|
| 2002/0198734 A1* | 12/2002 | Greene | H04L 67/22 709/220 |
| 2003/0028451 A1 | 2/2003 | Ananian | |
| 2004/0051740 A1* | 3/2004 | Reichel | G06F 9/54 715/789 |
| 2011/0239045 A1 | 9/2011 | Nakatsugawa et al. | |
| 2011/0276630 A1* | 11/2011 | Ekblom | H04L 67/104 709/204 |
| 2012/0117015 A1 | 5/2012 | Sathish | |
| 2013/0159472 A1* | 6/2013 | Newton | H04L 41/0856 709/219 |
| 2013/0275247 A1 | 10/2013 | Ramaratnam et al. | |
| 2014/0337472 A1* | 11/2014 | Newton | H04L 41/509 709/217 |
| 2014/0344425 A1* | 11/2014 | Varney | H04L 41/509 709/221 |
| 2015/0120479 A1 | 4/2015 | Bastien et al. | |
| 2015/0180736 A1 | 6/2015 | Leung | |
| 2016/0072683 A1 | 3/2016 | Xie et al. | |
| 2017/0124345 A1* | 5/2017 | Christiansen | G06F 16/1727 |
| 2017/0213239 A1 | 7/2017 | Leach et al. | |
| 2017/0278061 A1* | 9/2017 | Skaaksrud | H04L 67/12 |
| 2018/0013897 A1* | 1/2018 | Kumar | H04W 8/183 |
| 2018/0248977 A1* | 8/2018 | Leydon | H04L 67/327 |
| 2018/0278494 A1* | 9/2018 | Chen | G01N 3/58 |
| 2018/0367629 A1* | 12/2018 | Slosar | H04L 67/26 |
| 2019/0286890 A1 | 9/2019 | Khanna et al. | |

* cited by examiner

DIGITAL SERVICES FRAMEWORK

CROSS REFERENCE TO RELATED APPLICATIONS

The present application contains subject matter related to the subject matter in the following concurrently filed patent application: U.S. patent application Ser. No. 16/211,807, entitled "Extraction and Distribution of Content Packages in a Digital Services Framework."

BACKGROUND

The present disclosure relates to computing and data processing, and in particular, to a digital services framework.

Many products and services involve a complex network of relationships. Multiple users can be impacted, for example, when a product or service is updated. The use of a computer-based network can facilitate communications between the various users. For example, a cloud-based network may be implemented that can host computing resources that can be access by various users of a product or service. The computing resources may be provided to businesses and individuals as a remote computing service or as "software as a service." The users, or tenants, may include entities that may communicate, collaborate, and exchange data while providing various services and products. For example, the tenants may include original equipment manufacturers (OEMs), service providers, and operators.

As the number and types of products and services increase, the amount and complexity of the relationships between the users can increase dramatically. Additionally, the volume and types of data associated with the products and services can be significant. It may thus be increasingly costly to communicate relevant information to the various users in a timely manner.

It is with respect to these considerations and others that the disclosure made herein is presented.

DETAILED DESCRIPTION

Figure 1:
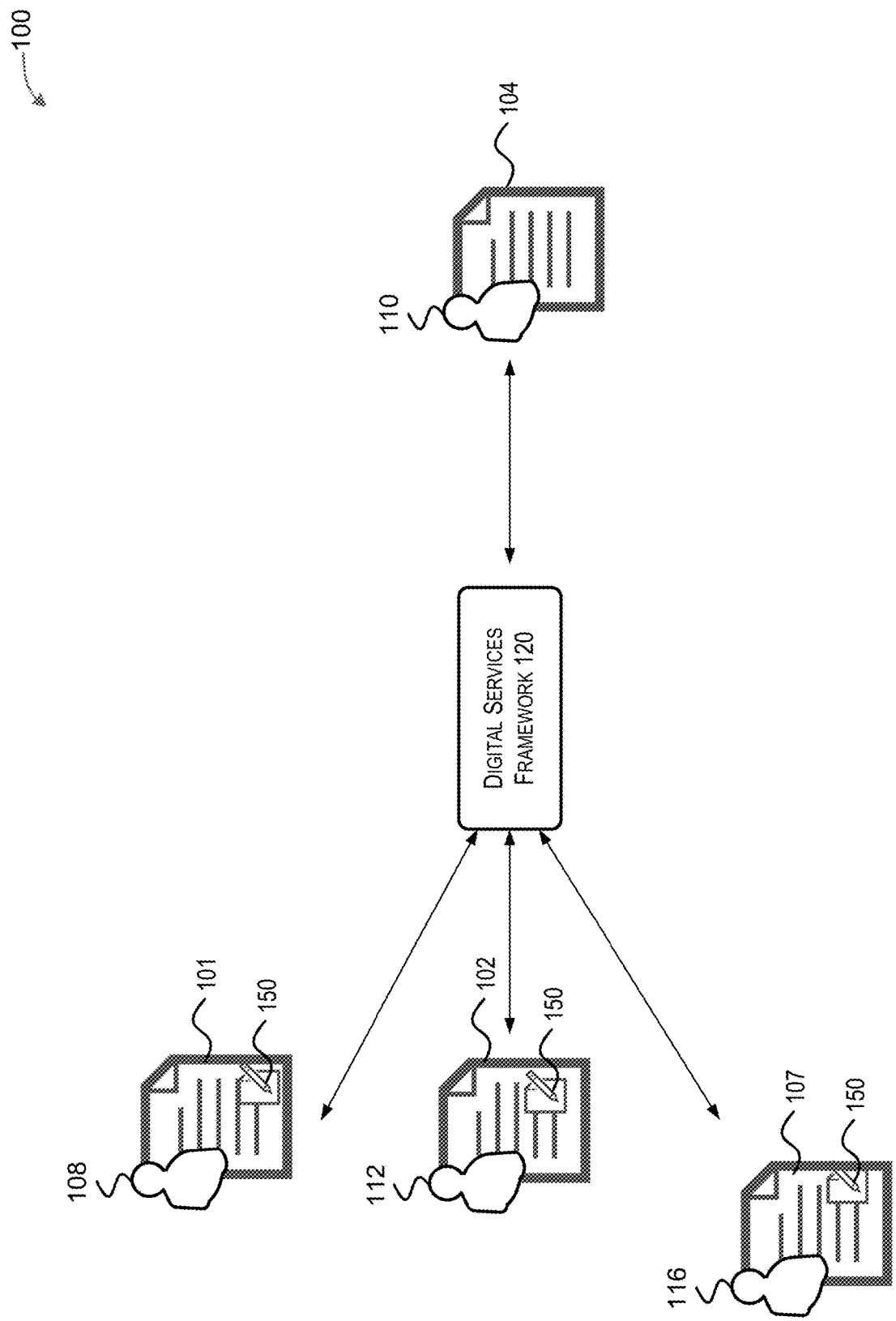
FIG. 1 illustrates a system for implementing a digital services framework according to one embodiment.

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Described herein is a digital services framework that may be implemented, in some embodiments, in a cloud-based network hosting computing resources that are allocated to various users or tenants. The computing resources may be provided to businesses and individuals as a remote computing service or as "software as a service." Such services may be provided, for example, using virtualization technologies that allow a physical computing device to host one or more virtual machines that appear and operate as independent computer devices to a connected user. The tenants may include entities that may communicate, collaborate, and exchange data while providing various services and products. For example, tenants may include original equipment manufacturers (OEMs), service providers, and operators. In various embodiments disclosed herein, the digital services framework may be configured to allow the tenants to define subscription-based content packages that use rules and semantics to enable collection and distribution of hierarchical data associated with serviceable products. The content packages may be instantiated as data structures defined by the rules and semantics, and the data can include digitized representations of product information, in-field data, and analytics.

The present disclosure further describes systems and methods for the extraction and distribution of the content packages created in the digital services framework. The systems and methods may be configured to selectively populate and distribute the subscription-based content packages. In one embodiment, a system may be configured to collect hierarchical data associated with the serviceable products. The hierarchical data may be collected based on analysis of topological relationships between the networked tenants as well as the hierarchical structure of the data. The content packages may be populated with the collected data. Distribution data flows may be identified that are consistent with the user-defined rules and semantics.

The content packages may include various types of data associated with products and services. The data may include digitized representations of product documentation, failure modes and predictions, data sheets, monitoring information, simulations, alerts, and the like. As used herein, such data may be referred to as a digital twin, indicative that the data is a digital representation of the product information. In one example, digital twin information for a component may include component information such as model, life cycle, systems, groups, installation location, and equipment information; structure and parts information such as highlights, structure, and spare parts; documentation such as documents, instructions, failure modes, alert types, announcements, and improvement requests; monitoring information such as indicators and component indicators; maintenance and service information such as notifications and work orders; and timeline information such as dates for significant events.

The collection, aggregation, and distribution of the content packages may require a significant amount of resources. Computing resources are needed to collect, analyze, organize, store, and distribute the content packages. Additionally, a significant amount of effort may be expended to create, enter, and review the content packages. The disclosed embodiments may allow for various users of the digital services framework to define content packages through a complex hierarchy of digital twin information and communicate availability of the content packages to other users of the digital services framework. Users may receive information about content packages that are relevant to their history, such as products and services that are in use by a given user. Users may subscribe to content packages that may be beneficial for their acquired products and services. The digital services framework may thus enable a cloud-to-cloud commercialization model for creating and distributing content packages for a complex hierarchy of products and services over a cloud-based network.

In one illustrative example, a component that is part of the digital services framework may include a manufacturer of the component, an operator of the component, and service provider for the component that may have a service level agreement (SLA) with the operator of the component. The manufacturer of the component may provide basic information for the component to the operator and service provider, such as data sheets and maintenance manuals. However, there is significant information that can be collected and analyzed, at some cost, which may provide additional benefit to the operator and service provider. Such information may include analytics from collected field use data, mean time between failure (MTTF), and predictive failure models for the component under various operating conditions. A user of the digital services framework may create a content package on the digital services framework that include at least some of this information. The user may further selectively cause the announcement of the content package to be sent to users of the digital services framework such as operators of the component and service providers for the component. The users of the digital services framework may subscribe to the content data package, which may then be distributed to the subscribing users. In this way, value-added information may be created by users of the digital services framework for subscription by other users of the digital services framework in a way that leverages the information and networks enabled by the digital services framework. This may be implemented in an efficient manner that provides advantages for the various users of the digital services framework in terms of greater operational efficiencies and more efficient usage of computing resources.

While some of the illustrated examples are described in terms of a physical component, but the principles may be applied to any component or service for which unique information may be constructed as a content package. The digital services framework provides the infrastructure for enabling the creation and distribution of the content data packages, including the package generation, storage, and distribution platforms, as well as the complex infrastructure that includes the content placeholders for the content data packages and their source information. In some embodiments, the content placeholders may be implemented as extensions of the digital services framework. The content placeholders may be populated with specific content that may be generated by a user of the digital services framework. In some embodiments, the content package may be a collection of metadata that can be populated as information becomes available or as otherwise provided by the digital services framework.

In one example implementation of a digital services framework, a data hierarchy may be implemented that includes a complexity that is illustrative of a network for providing and servicing components and systems. In such an example, the complexity may include the following levels: company, classes, subclasses, model, equipment, and spare parts and components. Additionally, one or more of the following types may be relevant to a level: attributes, data sheets, documents, failure modes, announcements, and spare parts. Such a hierarchy may be implemented in scenarios that support networks for a variety of industries, including but not limited to agriculture, transportation, computing, and manufacturing. With such an implementation of the digital services framework, various embodiments may provide a way to define and create a content package based on the complexity levels that are implemented for a given product or service. The digital services framework may allow for the user to define how to combine various types and levels, and how to distribute the content packages.

In some embodiments, content packages may be generated by a template that defines types as semantics and that defines how the semantics are shared. In an embodiment, semantics for a complexity level can by inherited from the parent's complexity level in a tree structure. Additionally, the user may select types that are to be inherited from the parent, as well as additional types that may be added to the content package that are not inherited from the parent. For example, selectable inheritance types may be predefined at each level and available for selection in the content package. Additionally, each level may have unique types that are not inherited from a parent and are applicable for a particular level.

In one illustrative example, a content package for a component such as a pump may be defined with spare parts and announcements by a first tenant of the digital services framework. A second tenant who has previously acquired the pump and operates the pump may be notified of a content package for spare parts via an announcement for the content package. The second tenant, via the digital services framework, may select the digital services framework and view information about the digital services framework. The rendered information may be specific to the second tenant. Because the second tenant has subscribed to the announcements for the pump, the second tenant may receive additional announcements, for example an announcement that notifies users of a new model of the pump, a change to the recommended inventory level for the pump, or a firmware update for the pump. If the second tenant did not subscribe to the announcements, then the second tenant may need to request information or otherwise proactively request information pertaining to the pump. Additionally, without the infrastructure provided by the digital services framework and the ability to proactively define content packages, announcements that pertain to fielded components may only be generated when necessitated by incidents. The digital services framework may provide a way to proactively generate data packages and send announcements for the data packages to tenants who have subscribed to the announcements, ensuring delivery of the announcements to those tenants who are most likely to benefit from the content packages. Additionally, tenants who generate data packages may select additional tenants or classes/levels of tenants who may receive the announcements.

The announcements may be generated for classes of components or systems and may be associated with a metadata class. The semantics can be shared across networks of the digital services framework network. The information for the announcements can be populated based on these semantics, based on information that is input to the digital services framework. The digital services framework may thus allow for content packages that are unique for each subscribing tenant based on specific information that populates the content package based on the semantics.

The population of information in the content packages as well as the distribution of the content package subscriptions may be implemented based in part on topological aspects of the cloud-to-cloud networks of the digital services framework. The topological aspects may also be used to inform the selection of recipients for the content packages. More generally, the digital services framework may be configured to selectively populate and distribute the subscription-based content packages based on analysis of topological relationships between and within the networked tenants as well as the hierarchical structure of the data. Distribution data flows may be identified that are consistent with the user-defined rules and semantics, based on the topological relationships and hierarchical structures.

For a given network of tenants in the digital services framework and a defined content package, various aspects of the organization relationships of the tenants may be analyzed. For example, the rules of authorization and tenant credential flows may be used to enable advertisements to various tenants. As another example, if operators use different models and different inventory levels, aspects of the organization relationships may be analyzed to determine which advertisements to send for a given content package.

In an embodiment, the digital services framework may be configured to analyze organizational links and data links for the tenants in the digital services framework. The organizational links may include organizational structure information for a given tenant. The data links may be determined based on semantics that are defined for a given data package. Based on the analyzed organizational links and data links, data flows for the content package may be determined by the digital services framework.

FIG. 1 illustrates a block diagram 100 showing how various tenants may access and utilize a digital services framework 120. Information may be updated by various tenants and updates may be provided to the tenants. In some embodiments, digital services framework 120 is configured to create and edit metadata 150 that is included in content package 101, content package 102, and content package 107. These content packages have associated tenants 108, 112, and 116.

In an embodiment, as content package 101, content package 102, and content package 107 are created, updated, and made available, updates may be received by digital services framework 120 and content package 101, content package 102, and content package 107 may be stored and made available to various tenants of the digital services framework 120. In one example, tenant 110 may subscribe to one of the content packages 101, 102, or 107. Digital services framework 120 may track updates to the subscribed content package, and digital services framework 120 may populate the subscribed content package, generated a populated content package 104. Populated content package 104 may be sent to tenant 110.

Figure 2:
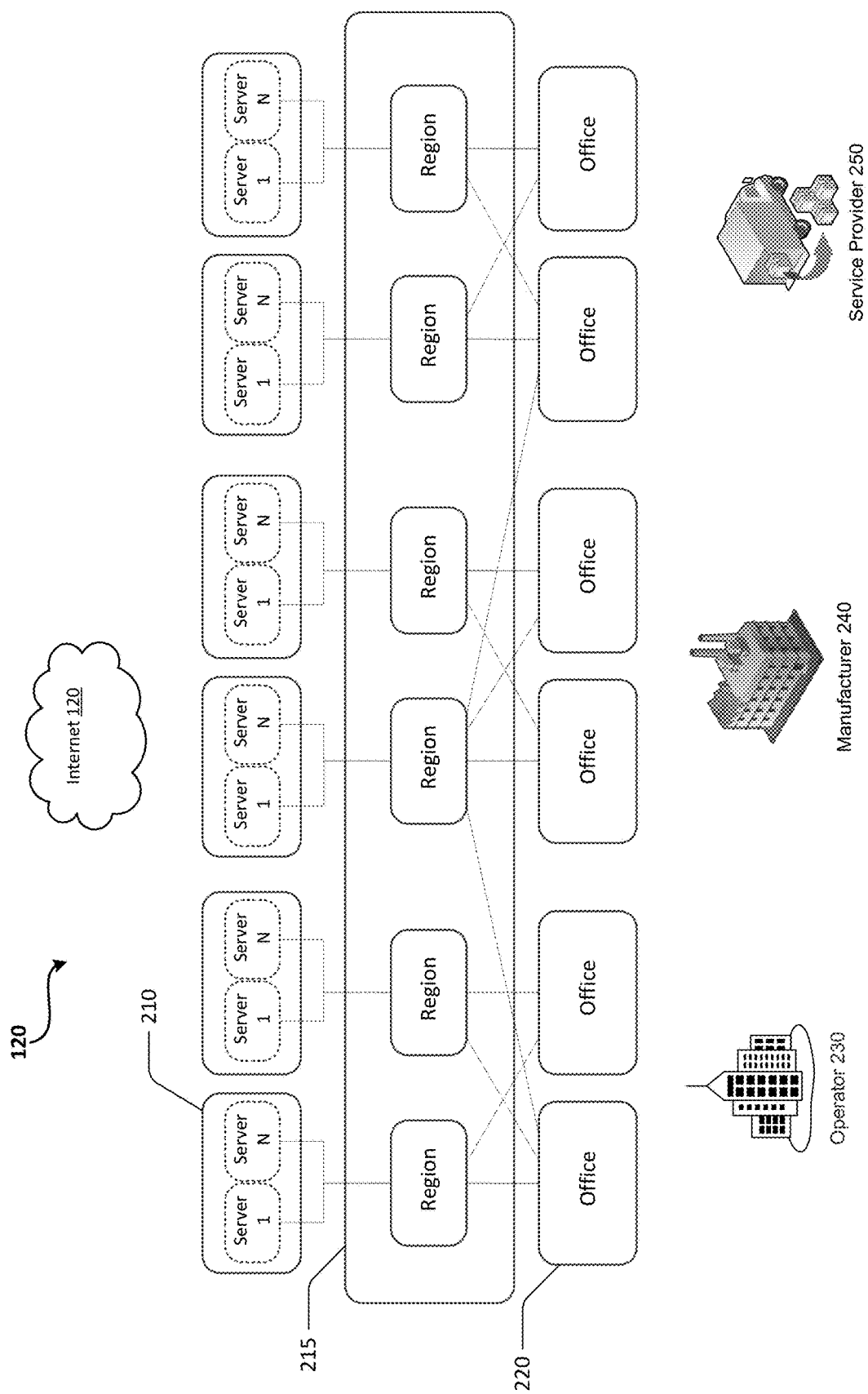
FIG. 2 illustrates an example architecture for implementing a digital services framework according to another embodiment.

In one example embodiment depicted in FIG. 2, a digital services framework 120 may be implemented as a cloud-based computing environment configured to provide an interactive platform for multiple tenants that share data and other resources. In this example, a digital services framework 120 may be implemented across multiple regions 215 that provide access to various tenants, including operator 230, manufacturer 240, and service provider 250, which access the digital services framework 120 through offices 220 using computing resources 210. For example, service provider 250 may collect failure mode data for a component under various operating conditions. The service provider 250 may provide various data that can be analyzed to enable predictions of failures for the component and may define a content package that allows various other tenants to subscribe to the analytic data.

Figure 3:
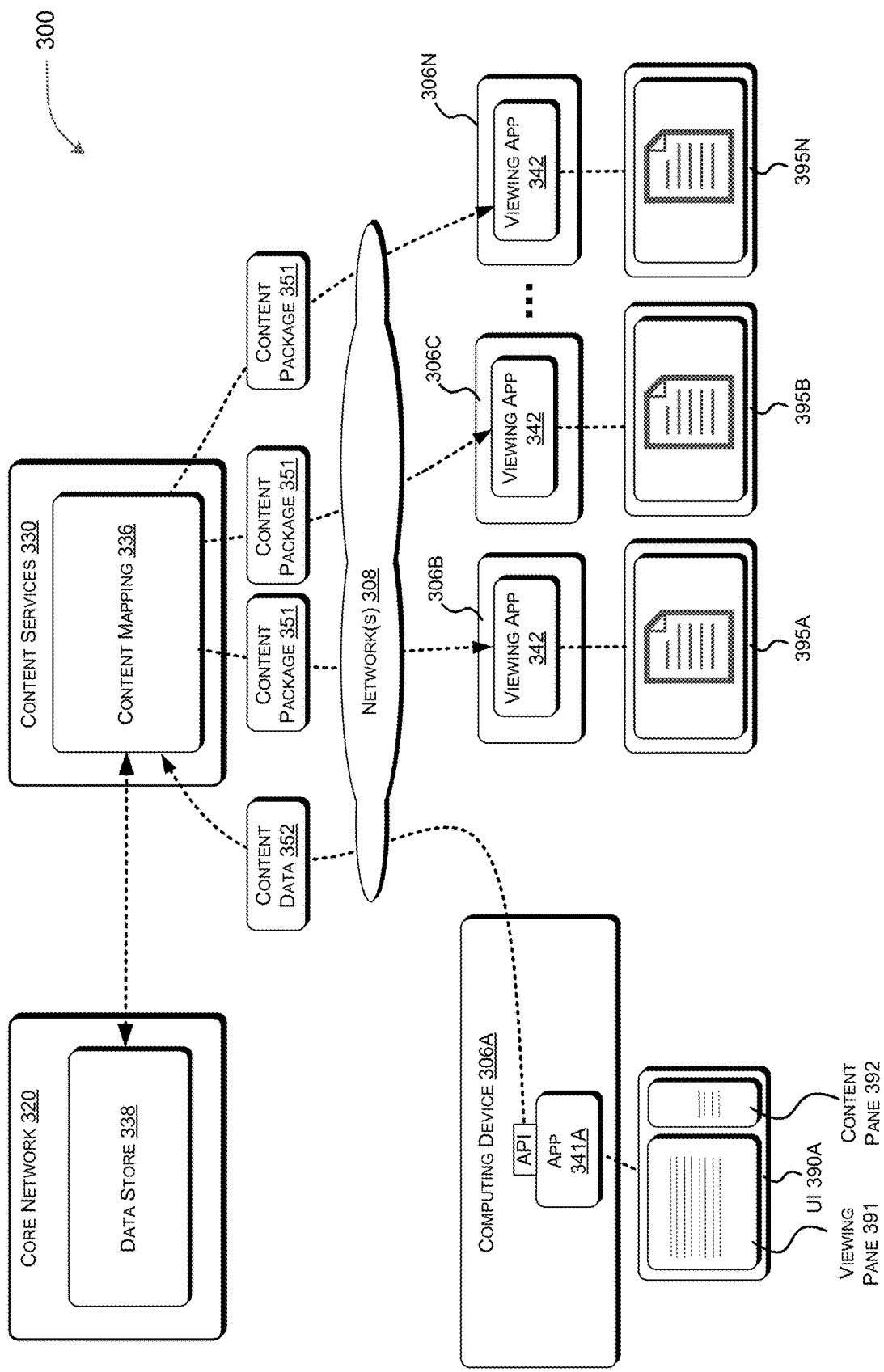
FIG. 3 illustrates an example architecture for implementing a digital services framework according to another embodiment.

FIG. 3 illustrates a system 300 for enabling the generation, storage, and updating of content packages from applications 341. In this example, a user can interact with an individual application 341 to create and edit content packages, and view and add or edit data that is inserted in a particular content package. The application 341 may each be configured to display a viewing pane 391 and a content pane 392. The content of a content package may be displayed in the viewing pane 391. A user may be enabled to select types of content to be added to the content package. In one embodiment, a content pane 392 may allow a user to preview data for a content type for a given product or service. The content pane 392 may be synchronized to enable a user to work within each application 341 and view a current version of a content package that they are editing while also viewing content specific to a particular product or service.

The selected content package defined in the content pane 392 can be used to generate content data 352 having semantics, rules, metadata, and the like. In some embodiments, digital services framework 120 can identify or generate content packages for use by multiple users and applications.

Content package 351 can include text, images, media, or any other form of data. The content package 351 can include data that is received by content services 330 and mapped by a content mapping component 336. Various data can be stored in data store 338 of core network 320. In some embodiments, content data 352 can include rules, metadata, and/or semantics that are integrated into, or linked to, the content package 351.

The content package 351 can be communicated to any number of computing devices 306, referred to herein as computing devices 306B-306N, from a first computing device 306A or the content services 330 via a network 308. Each computing device 306B-306N associated with a recipient can display the content package 351 on a user interface 395 (395A-395N) by the use of a viewing application 342. The viewing application 342 can be any suitable application such as a presentation program, a web browser, a media player, etc. The viewing application 342 may also be a web-based application. In one embodiment, the viewing application 342 may be a virtual assistant that uses voice, or an augmented reality, mixed reality, or virtual reality device.

It should be appreciated that the subject matter described herein may be implemented as a computer-controlled apparatus, a computer process, a computing system, or as an article of manufacture such as a computer-readable storage medium. The various described services and functions may be remotely implemented such as on a server or may be implemented on one or more devices. Among many other benefits, the techniques shown herein improve efficiencies with respect to a wide range of computing resources. For instance, human interaction with a device may be improved, as the use of the techniques disclosed herein enable users to share and consume data from a wide range of data types. In addition, improved human interaction improves other computing resources such as processor and network resources, e.g., users can work from a reduced number of applications and reduce a user's computer interaction, reduce the chances of an inadvertent input, reduce network traffic, and reduce computational cycles. Furthermore, instead of distributing data to users who may not use or need the data, content can be selectively distributed to subscribing users. Thus, data is distributed based on need, thus improving the efficiency of storage and network resources. Other technical effects other than those mentioned herein can also be realized from implementations of the technologies disclosed herein.

Figure 4:
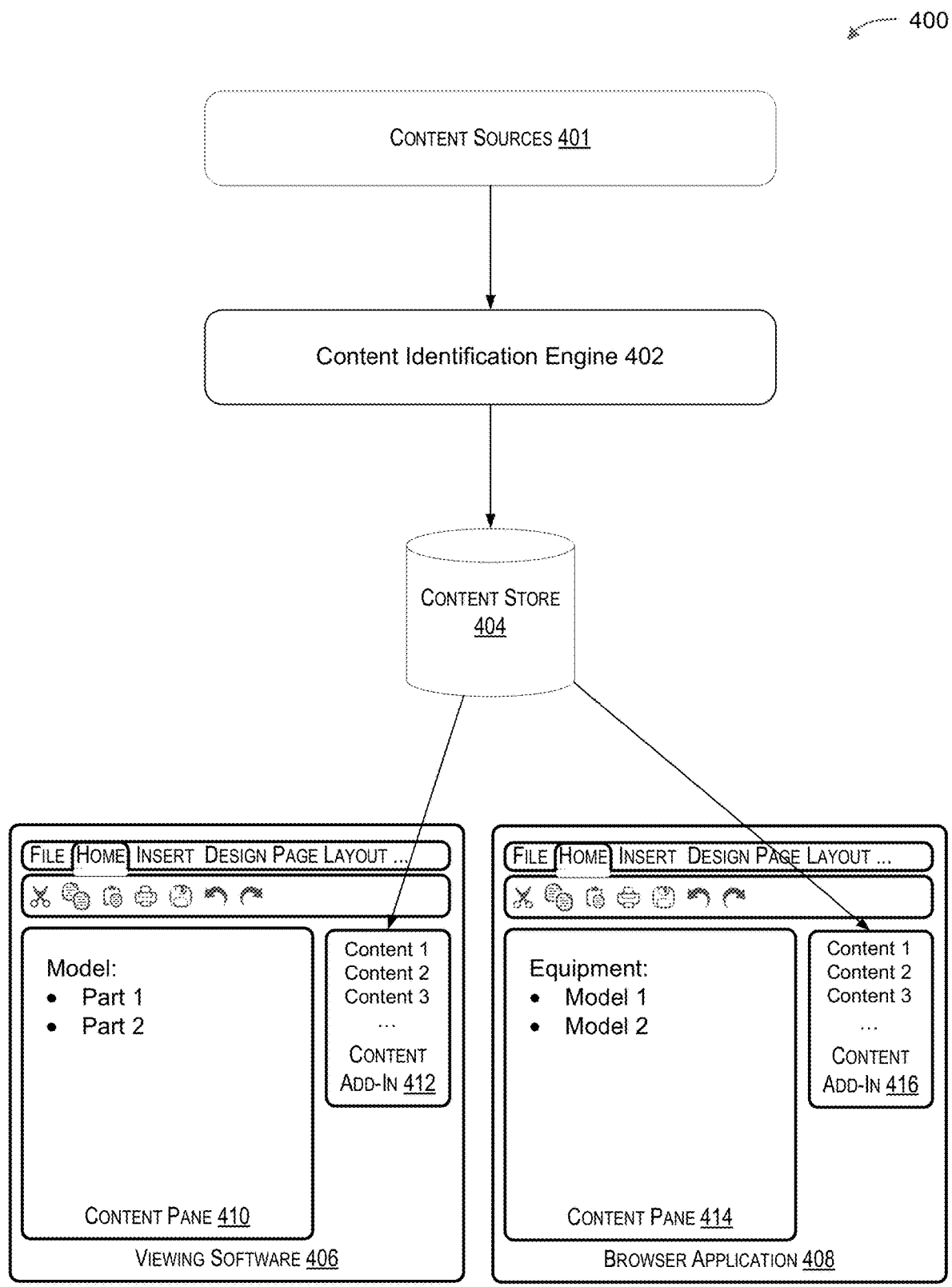
FIG. 4 illustrates an example of a user interface for a digital services framework according to another embodiment.

FIG. 4 illustrates a block diagram 400 for identifying content for content packages. In some embodiments, content sources 401 may include documents, emails, spreadsheets, graphics files, and the like. These items may be accessed via a network by content identification engine 402. Content identification engine 402 may receive content, including metadata associated with the content, to associate content with metadata. In some embodiments, content may be stored in content store 404, which may be implemented by a storage service.

In some embodiments, content stored in content store 404 may be retrieved by software applications, such as viewing software 406 or browser application 408. These applications may be configured to include content panes 410 and 414 where content is displayed. Applications 406 and 408 may also include content add-ins 412 and 416. In some embodiments, the content add-ins may render content or list selected content edited by applications 406 and 408 and displayed in authoring panes 410 and 414.

A user interface for defining content packages may be instantiated according to one embodiment. In one embodiment, a local computer may be configured to render content package options with data from content store 404. In this example, a local computer includes a display, and the local computer may execute applications 406 and 408 that generate content package options. The information for rendering particular options for a content package may be derived from data stored on one or more second computer systems that may include content store 404 and content identification engine 402. Options for a content package are derived from content store 404 and content identification engine 402 may be stored on servers and storage devices and accessed across a communication network such as the Internet. The servers may be part of a cloud computing network, for example. In this example, content store 404 may store data sets in one or more databases or similar data repository systems.

In one example embodiment, applications 406 and 408 may be implemented as application logic in a web browser, such as, for example, Chrome, Internet Explorer, Edge, Firefox, Safari, or similar browser software. A local computer may execute the browser software that may include a visualization application which accesses data sets stored on content store 404. In one embodiment, applications 406 and 408 may be configured to select one or more data sets from content store 404 and interactively create a plurality of content package options derived from the selected remote data sets. For example, users may select any one or more of the rendered content package options, define the selected options as a new content package, preview the content package using the applications 406 and 408, and save the created content package.

Figure 5:
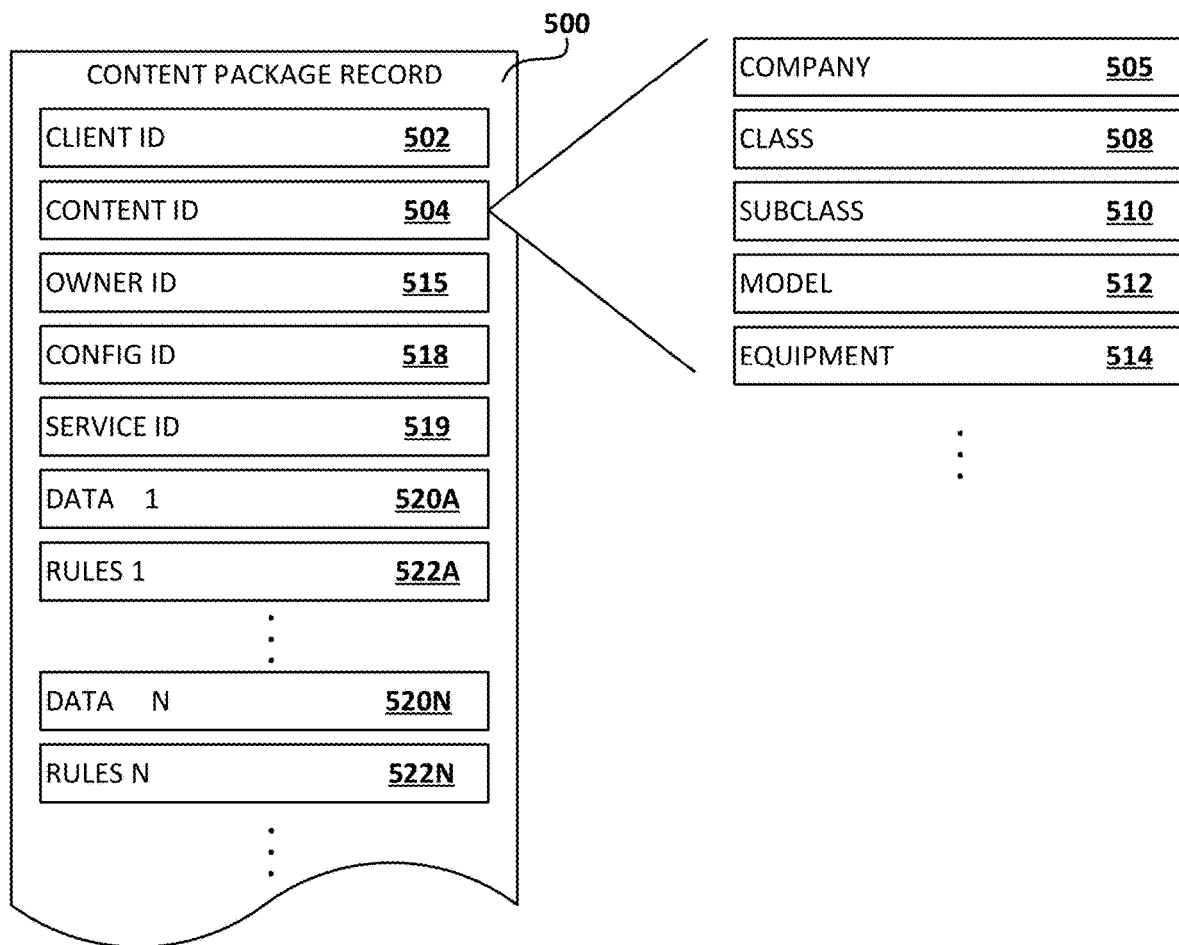
FIG. 5 illustrates a data structure for implementing a digital services framework according to an embodiment.

FIG. 5 illustrates a data structure diagram showing a number of data elements stored in a content package record 500 that includes metadata stored for a content package. It will be appreciated by one skilled in the art that the data structure shown in the figure may represent a data file, a database table, an object stored in a computer memory, a programmatic structure or any other data container commonly known in the art. Each data element included in the data structure may represent one or more fields in a data file, one or more columns of a database table, one or more attributes of an object, one or more variables of a programmatic structure or any other unit of data of a data structure commonly known in the art.

Each content package record 500 may contain a client ID 502 identifying the tenant of the digital services framework for whom the content package record 500 is created. According to one embodiment, each content package record 500 may also contain a content ID 504 that may be associated with the content package. The content ID 504 may correspond to a unique identifier associated with the content item stored in the digital services framework, for example. In one embodiment, each content package of digital services framework may have an associated content package record 500, which may be stored in a database communicatively coupled to the digital services framework.

In some embodiments, the content package record 500 may additionally or alternatively contain various metadata describing the associated content ID 504, including company 505, class 508, subclass 510, model 512, equipment 514, and the like. The content package record 500 may also contain an owner ID 515 indicating an identification of a particular user associated with the record. The owner ID 515 may correspond to the identifier information provided by a user associated with the tenant identified by client ID 502 when signing up for services by the digital services framework.

The content package record 500 may also contain information regarding a configuration ID 518, corresponding to a particular configuration of the digital services framework, and service ID 519 that corresponds to identification of a service agreement. The content package record 500 may further contain information regarding one or more data records 520A-520N (also referred to herein generally as "data 520") and rule records 522A-522N (also referred to herein generally as "rules 522"). The data records 520A-520N may include selected data types for the content package such as attributes, data sheets, documents, failure modes, announcements, and spare parts. As further discussed, a user may access contents of content package record 500 via a user interface or other means. It will be appreciated that the content package record 500 may contain additional data elements beyond those shown in FIG. 5 and described above that are utilized by the digital services framework and/or other systems and services.

In some embodiments, at least some portions of content package record 500 may be implemented as a Javascript Object Notation (JSON) object. This may advantageously allow the digital services framework to communicate the content package record 500 to various components and functions of the digital services framework. An example of a simple JSON in accordance with the present disclosure is illustrated in Appendix A attached hereto.

Figure 6:
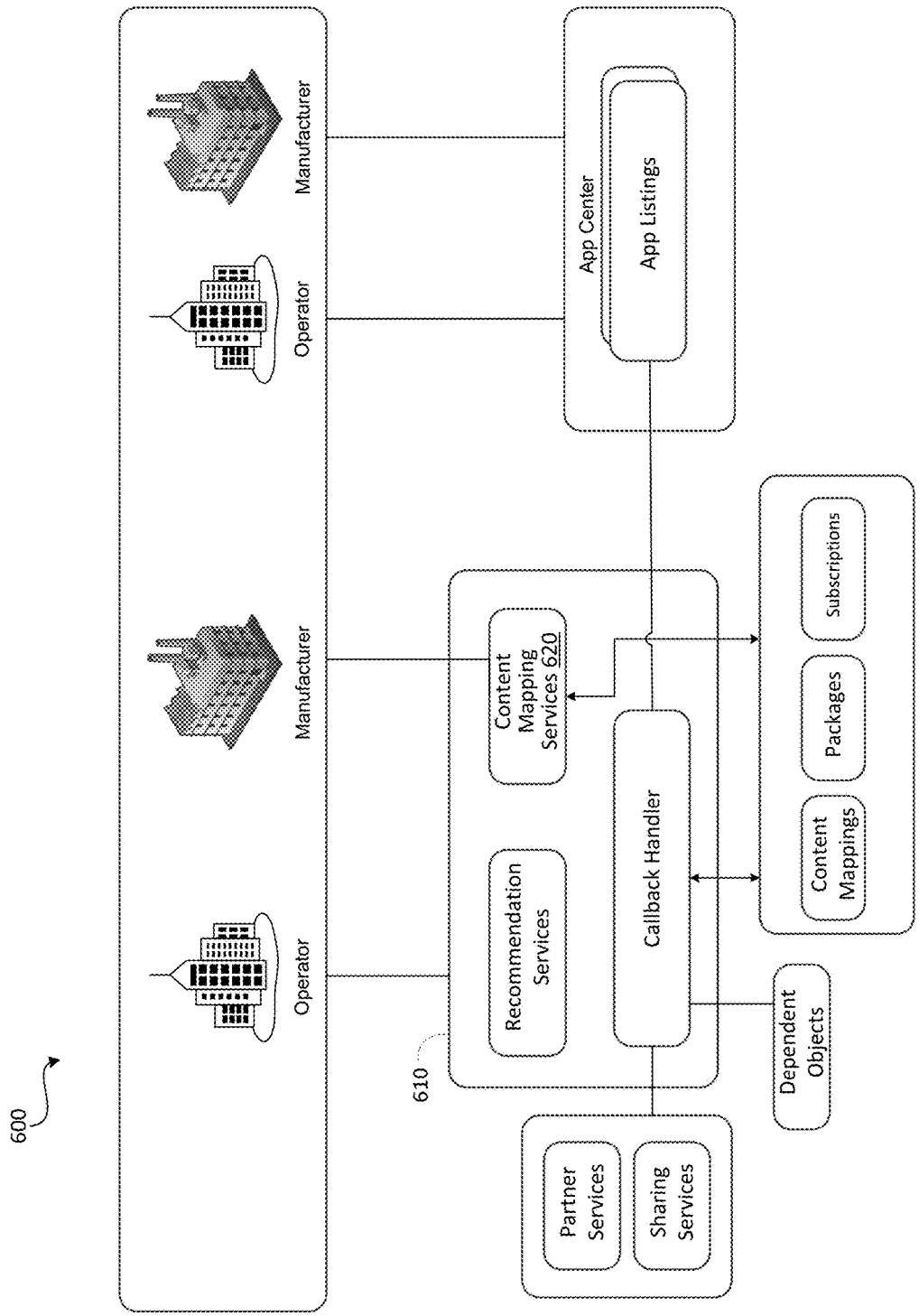
FIG. 6 illustrates a system for implementing a digital services framework according to another embodiment.

A computing environment for implementing the digital services framework may implement cloud-to-cloud transactions and subscription management. One example computing environment is illustrated in FIG. 6. In an embodiment, a digital services framework 600 may include an application platform 610 where content packages may be made available for subscription. The digital services framework may implement middleware in the application platform to enable and facilitate creation and distribution of the content packages. The digital services framework 600 may further implement a content mapping component 620 that receives the user definition of content packages, creates a mapping to information sources that are accessible to the digital services framework, and generates a listing of recipients for the content package.

In an embodiment, the digital services framework middleware implemented in the application platform 610 may be configured to process tokens between various networks of the digital services framework 600. Components of the digital services framework 600 may be implemented for content package creation, including functionality for generating semantic rules, tokens, and other information for creating, processing, and distributing content packages including generating callback URLs, managing subscriptions, subscription upgrades, and communication and credential flow.

For a given content package, the metadata may be defined by the semantics for the package. The fulfillment of the content package may be different for each subscriber based on the collected information for each subscriber. For example, the content package may be populated based on the inheritance tree of the content package as well as the technical elements of the content as the tree is traversed.

The fulfillment of the content package may also be determined in part by analysis of the topology, which may include tenant type, such as manufacturer, service provider, operator, auditor, etc.

The fulfillment of the content package may further be determined in part by analysis of the tenant history. For example, some operators may operate one model of a component, while another operator may operator two or more different models of the component. The content package may thus selectively include information for each of the models in use by the operator.

The analysis of the topological aspects of the content package may be used to perform an impact analysis for a content package. The impact analysis may include a determination of which aspects of a tenant's organizational and data flows, based on the inheritance structure and semantic rules, are impacted by the content package. Furthermore, a determination as to whether this tenant should receive an announcement can be made. If it is determined that the tenant should receive the announcement, the tenant receives an announcement, and the tenant may determine whether to subscribe to the content package.

Figure 7:
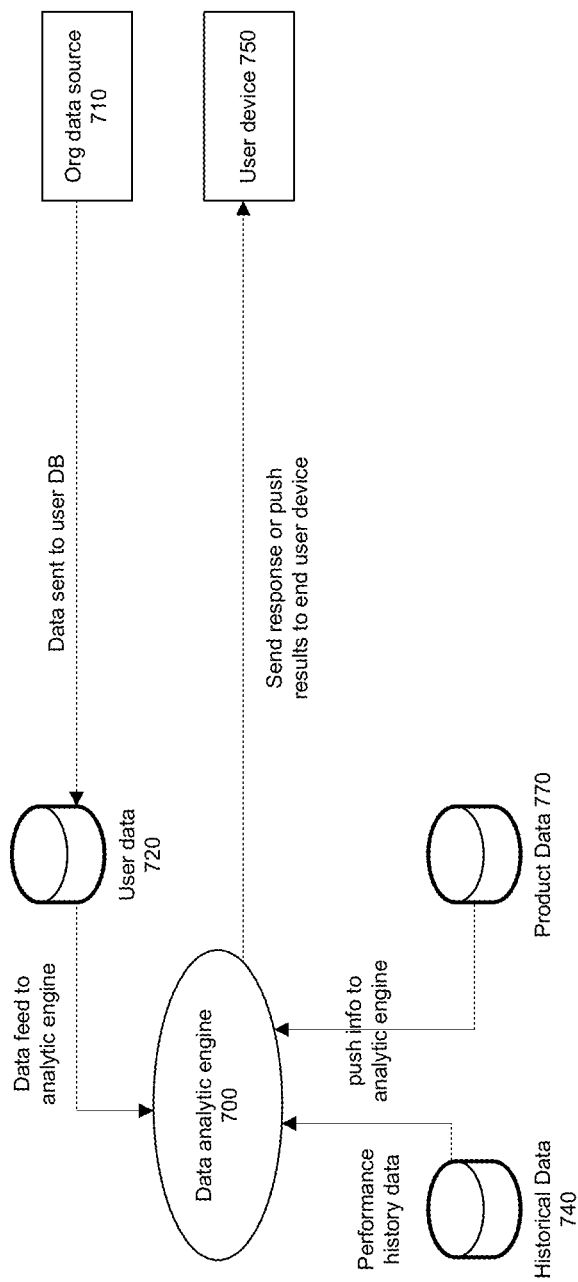
FIG. 7 illustrates an analytics engine for a digital services framework according to another embodiment.

In some embodiments, the digital services framework can include an analytics engine that is configured to analyze organizational and topological aspects associated with a content package. The analytics engine may execute, for example, on one or more servers of the digital services framework as described herein. It will be appreciated that some embodiments may involve implementing the analytics engine using additional computing resources. FIG. 7 illustrates an example of an analytics engine 700 for analyzing organizational and topological aspects. The analytics engine 700 may be co-hosted with servers and data stores of the digital services framework or a combination thereof. In some embodiments, a request may be received from a user device 750 for creating or editing a content package. In other embodiments, the request may be received from one or more services of the digital services framework. In response to receipt of the request, analytics engine 700 may log the request and provide updates as to the status of the request. The analytics engine 700 may communicate with other services to facilitate: (1) processing of the request, (2) collection of data pertaining to request, and (2) generating interfaces to provide results of the request. The analytics engine 700 may, for example, provide an interface for facilitating submission of the request. The analytics engine 700 may further provide an interface for viewing the results of the request and modifying or cancelling the request. The analytics engine 700 may be made accessible via an application programming interface (API) or a user interface that may be accessed via a Web browser or other input mechanisms.

In some embodiments, the analytics engine 700 may perform analysis of the organizational and topological aspects automatically. For example, the analytics engine 700 may monitor creation or updating of content packages in the digital services framework at a predetermined frequency or based on a request or other trigger.

The analytics engine 700 may provide an output to a requesting function or user. In some embodiments, an API can be called with information such as a device or application identifier and specified content package. The API may be configured to receive electronic messages that encode identifiers indicative of a data package analysis request for fulfillment by the analytics engine 700. In response to receiving one of the electronic messages, the API may send second electronic messages indicative of information indicating that the content package analysis request has been received and may provide the results of the content package analysis.

In the example shown in FIG. 7, the analytic engine 700 uses multiple data sources to identify recipients for the content package and selectively populate instances of the content package for users who have subscribed to the content package. The data sources may include text, graphics, or other data sent to a user database 720 from organizational data source 710, product data 770, and historical data 740. The illustrated cloud-based processing may enable recipient identification. The organizational data source 710, product data 770, and historical data 740 may be used by the analytic engine 700 to identify recipients for a content package and populate instances of the content package. A recipient list and/or populated content package may be sent to the user device 750 or requesting process.

The analytics engine 700 may be implemented at least in part on a system or function corresponding to FIGS. 1-6 and 8-11. The analytics engine 700 may further include a component that performs text pre-processing across the data to clean and tokenize the text. In some embodiments, a filtering operation may be performed to filter on key terms in the data. In some embodiments, the analytics engine 700 may generate a graph where pairs of vertices connected by an edge represents relationships between tenants or users, or between data types or data instances.

Figure 8:
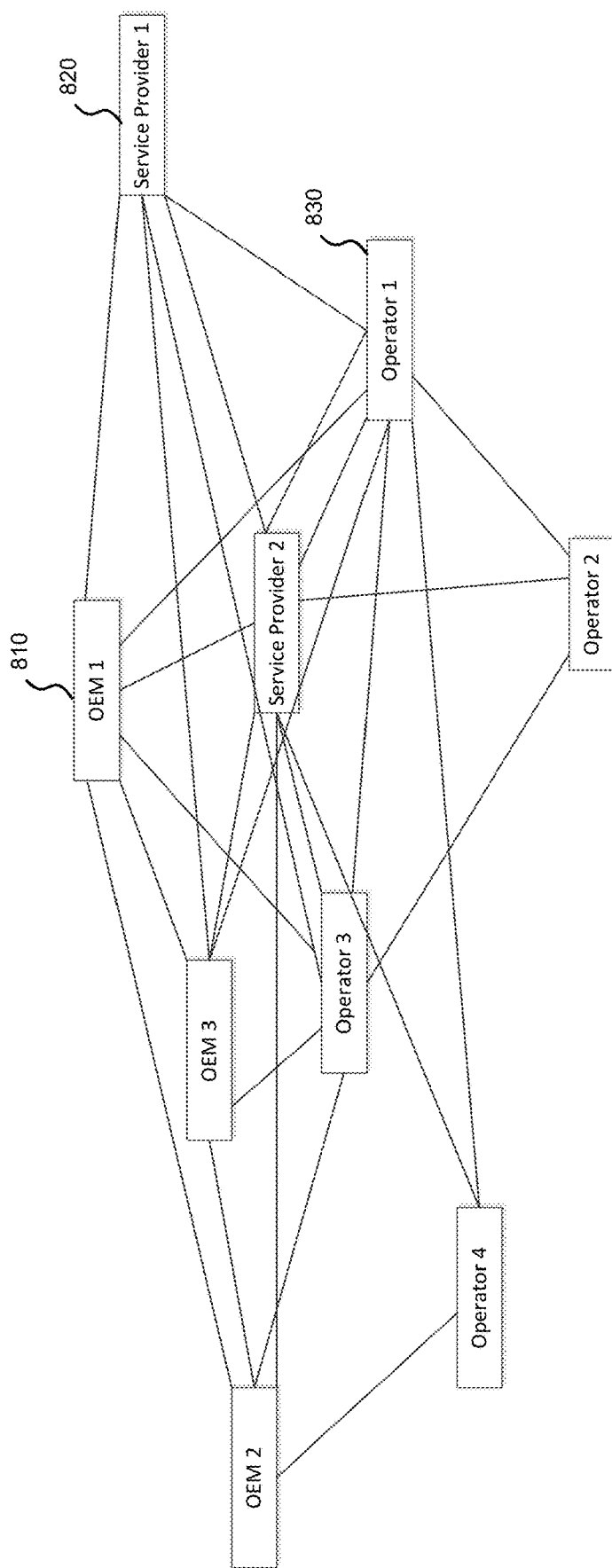
FIG. 8 illustrates an example of analyzing a topology according to another embodiment.

In an embodiment, a connected graph such as the one depicted in FIG. 8 can be generated. While FIG. 8 depicts graph nodes with tenants or users, such a graph may be generated to indicate relationships between products, between data types, or a combination. In the example shown, the graph includes OEM 1 (810), service provider 1 (820), and operator 1 (830). Each of these nodes are connected to other nodes, indicating their relationship with various other users. The graph may be traversed across the links to identify associations between the nodes. While the present example shows a graph indicating a many-to-many structure, other graphs may be generated such as a tree-like structure. In a tree-like structure, graphs can be traversed up and down the levels of parent and children nodes. For example, the ascendant hierarchy may be traversed to determine if a parent has been selected to be included in a content package. As another example, when multiple users within an organization are operating a particular component, the hierarchy of users may be traversed to determine which users within the organization are associated with a given product.

In some embodiments, the identified recipients and data that are associated with a content package may be stored and made available for further action and/or analysis. Additionally and optionally, the captured data may be sent to other devices and systems over a communications network for further action.

In some embodiments, the analytics engine 700 may be configured to aggregate and analyze data for various products and services to identify profiles, patterns, and statistics. For example, analysis of incident rates, health, and performance of a component or a service can be determined. Data mining of historical data for products and services can be used to identify various characteristics for inferring the current state of a product or service or a group of products or services.

It should be noted that while some example implementations are described with reference to products and services, the described principles can be applied to other types of scenarios where organizational, topological, and historical sources are available.

By providing an analytics engine that analyzes organizational, topological, and historical data, identifies recipients, and populates content packages as described herein, the need for extensive and complex review and analysis using manual methods and testing may be reduced or eliminated. Additionally, new or modified features may be more quickly provided in response to identified issues and product updates. Furthermore, implementation of analysis in the manner described can allow for greater accuracy and relevance of the collective information being analyzed. For example, if recipients and data for a content package are identified manually, some recipients and/or data may be completely missed. may not be properly prioritized, and related issues may not be identified. Additionally, recipients and data may be improperly identified as being relevant or may be redundantly applied. By using an analytics engine to analyze organizational, topological, and historical data and identify recipients and populate content packages automatically and comprehensively analyzing the data, more accurate results may be provided while reducing cost.

Figure 9:
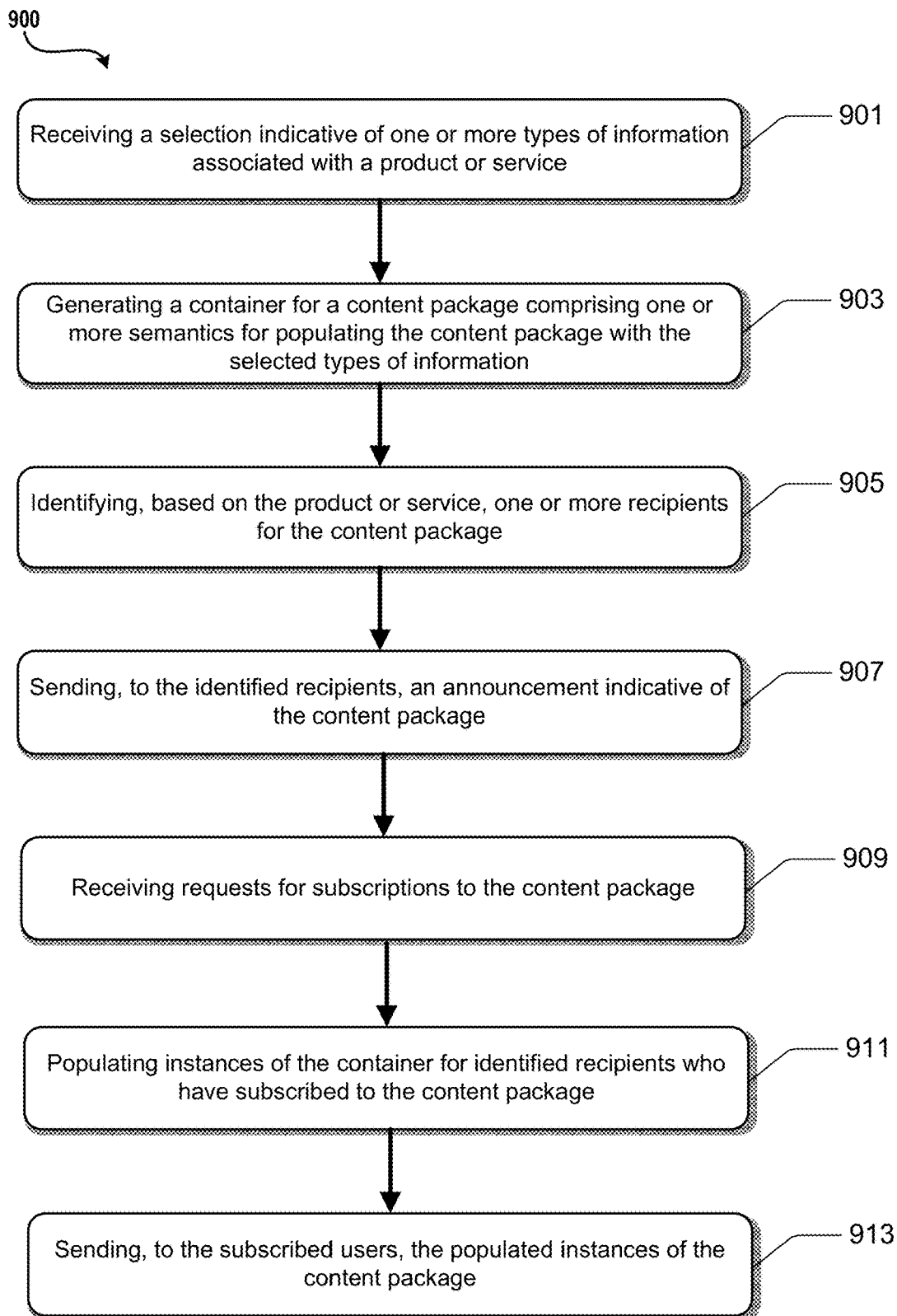
FIG. 9 illustrates a method according to an embodiment.

FIG. 9 illustrates an example operational procedure for communicating information in a networked environment comprising one or more computing devices, in accordance with the present disclosure. The operational procedure may be implemented in a system comprising one or more computing devices. Referring to FIG. 9, operation 901 illustrates receiving, by a computing device of a digital services framework, a selection indicative of one or more types of information associated with a product or service.

Operation 901 may be followed by operation 903. Operation 903 illustrates generating a data container for a content package comprising one or more semantics for populating the content package with the selected types of information.

Operation 903 may be followed by operation 905. Operation 905 illustrates identifying, based on the product or service, one or more recipients for the content package.

Operation 905 may be followed by operation 907. Operation 907 illustrates sending, to the identified recipients, an announcement indicative of the content package.

Operation 907 may be followed by operation 909. Operation 909 illustrates receiving, from one or more of the identified recipients, requests for subscriptions to the content package.

Operation 909 may be followed by operation 911. Operation 911 illustrates populating instances of the container for identified recipients who have subscribed to the content package. In an embodiment, the populating comprises populating the content package with the selected types of information based on the one or more semantics.

Operation 911 may be followed by operation 913. Operation 913 illustrates sending, to the subscribed recipients, the populated instances of the content package.

In an embodiment, the one or more types of information comprises hierarchical data associated with the product or service, the hierarchical data structured at a plurality of complexity levels.

In an embodiment, the types of information include digitized representations of product documentation, failure modes and predictions, data sheets, monitoring information, simulations, and alerts.

In an embodiment, the digitized representations include one or more of model, life cycle, systems, groups, installation location, equipment information, structure and parts information, documents, instructions, failure modes, alert types, announcements, improvement requests, indicators, component indicators, notifications, work orders, and timeline information.

In an embodiment, the complexity levels comprise one or more of company, classes, subclasses, model, equipment, and spare parts and components.

In an embodiment, the content packages are generated by a template that defines types as semantics and that defines how the semantics are shared.

In an embodiment, semantics for a complexity level are selectively inherited from a parent's complexity level in a tree structure.

In an embodiment, each level includes unique types that are not inherited from a parent and are applicable for a particular level.

Figure 10:
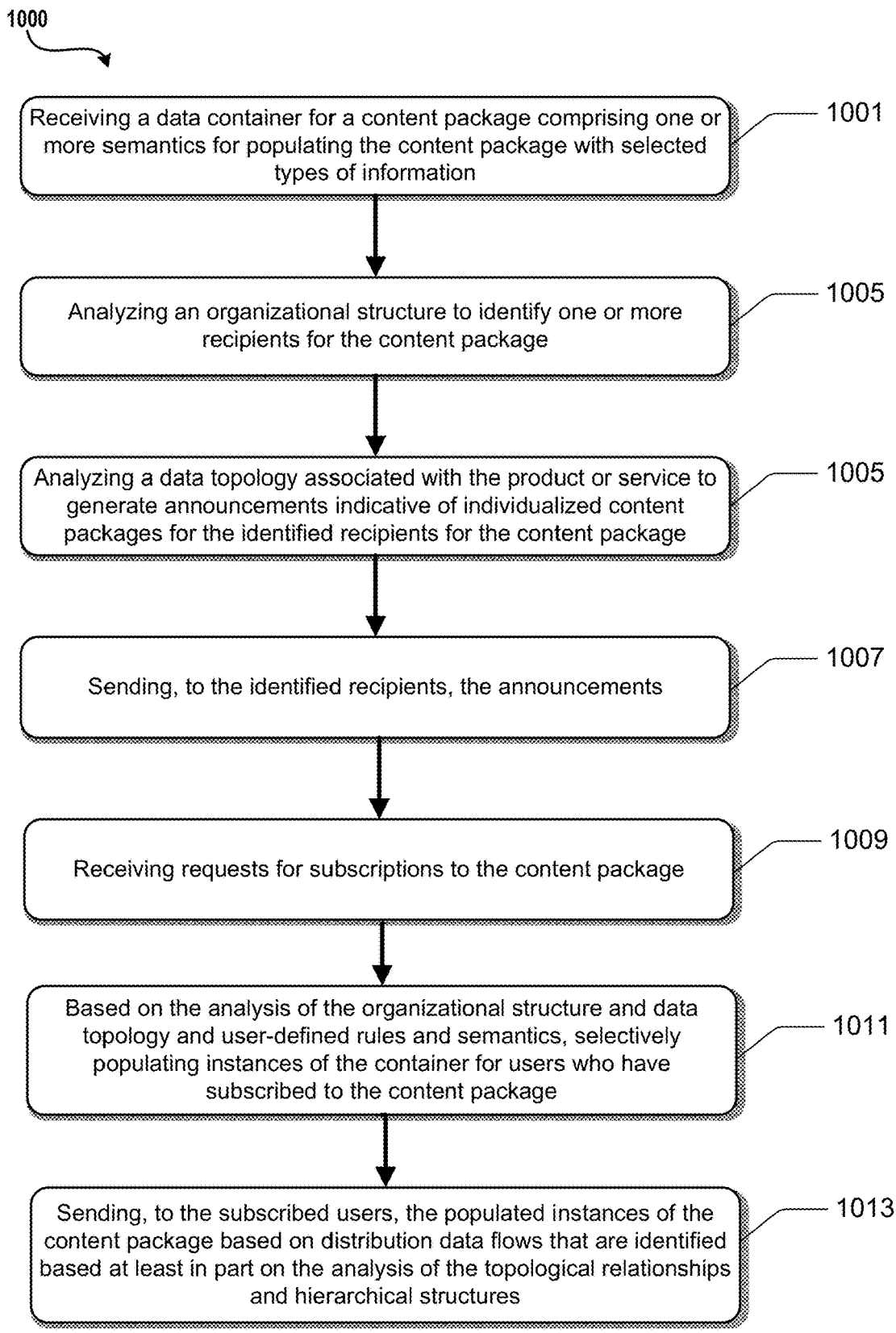
FIG. 10 illustrates a method according to an embodiment.

FIG. 10 illustrates an example operational procedure for communicating information in a networked environment comprising one or more computing devices, in accordance with the present disclosure. The operational procedure may be implemented in a system comprising one or more computing devices. Referring to FIG. 10, operation 1001 illustrates receiving, by a computing device of a digital services framework, a data container for a content package comprising one or more semantics for populating the content package with selected types of information associated with a product or service.

Operation 1001 may be followed by operation 1003. Operation 1003 illustrates analyzing an organizational structure between and within networked tenants of the digital services framework to identify one or more recipients for the content package.

Operation 1003 may be followed by operation 1005. Operation 1005 illustrates analyzing a data topology associated with the product or service to generate announcements indicative of individualized content packages for the identified recipients for the content package.

Operation 1005 may be followed by operation 1007. Operation 1007 illustrates sending, to the identified recipients, the announcements.

Operation 1007 may be followed by operation 1009. Operation 1009 illustrates receiving requests for subscriptions to the content package.

Operation 1009 may be followed by operation 1011. Operation 1011 illustrates based on the analysis of the organizational structure and data topology, populating instances of the container for users who have subscribed to the content package.

Operation 1011 may be followed by operation 1013. Operation 1013 illustrates sending, to the subscribed users, the populated instances of the content package.

In an embodiment, the data topology includes rules of authorization and tenant credential flows.

In an embodiment, the organizational structure includes models and inventory levels.

In an embodiment, the analyzing the organizational structure comprises:
  identifying a product or service associated with the content package;
  accessing a data store storing thereon identifiers of tenants associated with the product or service;
  determining transactional associations between the identified tenants and additional users; and
  generating a list of recipients for the content package based on the identified tenants and additional users.

In an embodiment, the analyzing the data topology comprises:
  based on the one or more semantics and the selected types of information, identifying one or more data stores storing thereon data associated with the product or service;
  accessing the one or more data stores to extract transactional associations for operational instances of the product or service; and
  based on the extracted transactional associations, generating a list of tenants and additional users that have a threshold likelihood of use for the content package.

In an embodiment, selectively populating comprises:
  identifying one or more data stores storing thereon data associated with the product or service;
  accessing the one or more data stores to extract transactional associations for operational instances of the product or service that are linked to a subscribed recipient;
  based on the extracted transactional associations, accessing the one or more data stores to populate an instance of the data container with data in accordance with the user-defined rules and semantics.

In an embodiment, the instance is populated by:
  traversing a data hierarchy defined by the user-defined rules and semantics,
  querying data from the one or more data stores based on the user-defined rules and semantics and the traversed data hierarchy; and
  linking the queried data to the instance.

In an embodiment, the queried data is securely accessible by recipients of the populated content package.

Hardware

Figure 11:
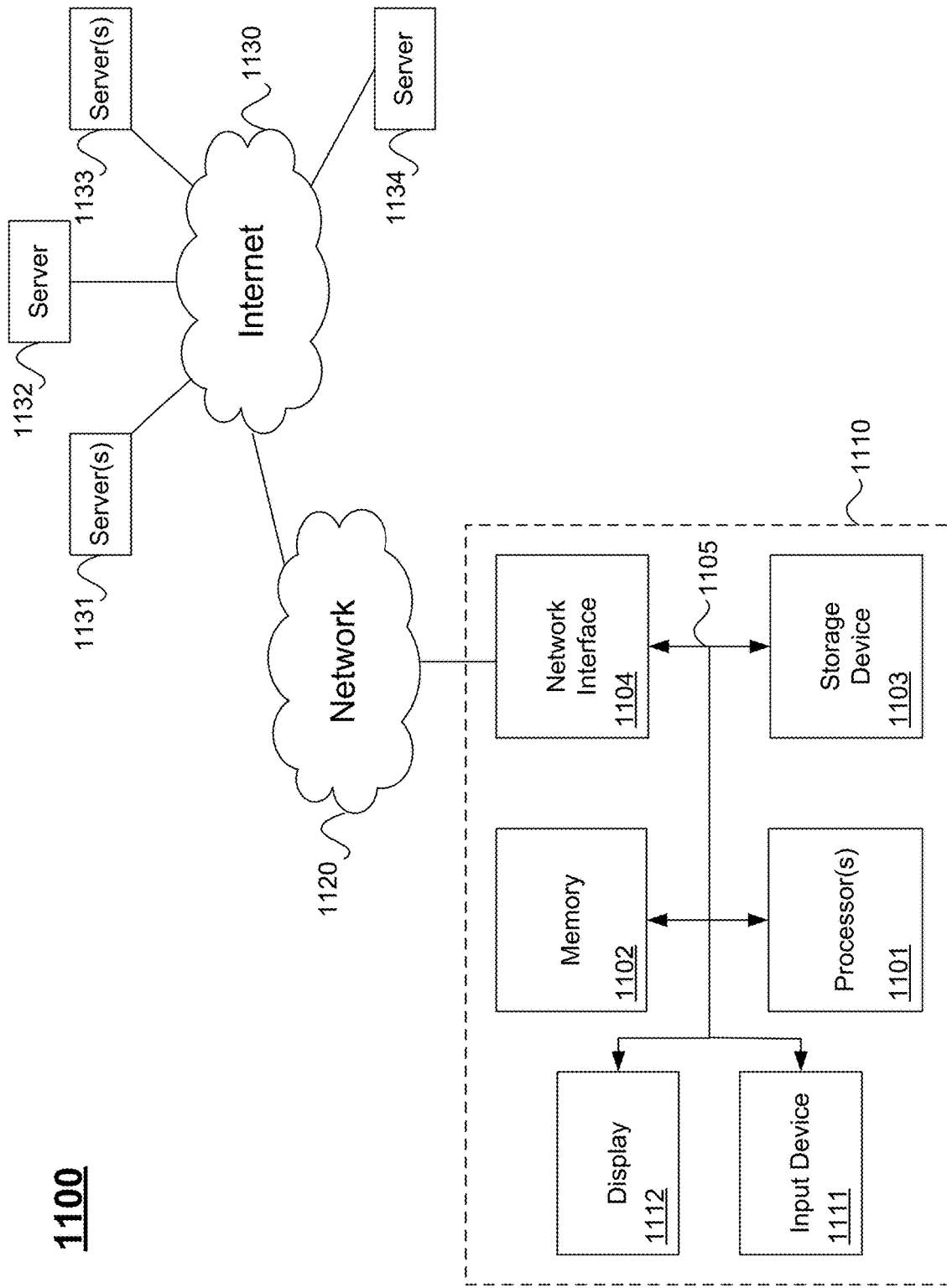
FIG. 11 illustrates hardware of a special purpose computing machine configured according to the above disclosure.

FIG. 11 illustrates hardware of a special purpose computing machine configured according to the above disclosure. The following hardware description is merely one example. It is to be understood that a variety of computers topologies may be used to implement the above described techniques. An example computer system 1110 is illustrated in FIG. 11. Computer system 1110 includes a bus 1105 or other communication mechanism for communicating information, and one or more processor(s) 1101 coupled with bus 1105 for processing information. Computer system 1110 also includes a memory 1102 coupled to bus 1105 for storing information and instructions to be executed by processor 1101, including information and instructions for performing some of the techniques described above, for example. This memory may also be used for storing programs executed by processor(s) 1101. Possible implementations of this memory may be, but are not limited to, random access memory (RAM), read only memory (ROM), or both. A storage device 1103 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 1103 may include source code, binary code, or software files for performing the techniques above, for example. Storage device and memory are both examples of non-transitory computer readable storage mediums.

Computer system 1110 may be coupled via bus 1105 to a display 1112 for displaying information to a computer user. An input device 1111 such as a keyboard, touchscreen, and/or mouse is coupled to bus 1105 for communicating information and command selections from the user to processor 1101. The combination of these components allows the user to communicate with the system. In some systems, bus 1105 represents multiple specialized buses, for example.

Computer system 1110 also includes a network interface 1104 coupled with bus 1105. Network interface 1104 may provide two-way data communication between computer system 1110 and a network 1120. Network 1120 may represent one or multiple networking technologies, such as Ethernet, local wireless networks (e.g., WiFi), or cellular networks, for example. The network interface 1104 may be a wireless or wired connection, for example. Computer system 1110 can send and receive information through the network interface 1104 across a wired or wireless local area network, an Intranet, or a cellular network to the Internet 1130, for example. In some embodiments, a browser, for example, may access data and features on backend software systems that may reside on multiple different hardware servers on-prem 1131 or across the Internet 1130 on servers 1132-1134. One or more of servers 1132-1134 may also reside in a cloud computing environment, for example.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method comprising:
  receiving, by a computing device of a digital services framework, a selection indicative of one or more types of information associated with a product or service, wherein the one or more types of information include digitized representations of product information associated with the product or service and wherein the one or more types of information include hierarchical data associated with the product or service, the hierarchical data structured at a plurality of complexity levels;
  generating a data container for a content package comprising one or more semantics for populating the content package with the selected one or more types of information, wherein the data container is a data structure of the content package defined by the one or more semantics;

identifying, based on the product or service, one or more recipients for the content package;

sending, to the identified recipients, an announcement indicative of the content package;

receiving, from one or more of the identified recipients, requests for subscriptions to the content package;

populating instances of the data container for identified recipients who have subscribed to the content package, wherein the populating comprises populating the content package with the selected one or more types of information based on the one or more semantics; and sending, to the subscribed recipients, the populated instances of the content package.

2. The method of claim 1, wherein the complexity levels comprise one or more of company, classes, subclasses, model, equipment, and spare parts and components.

3. The method of claim 1, wherein the one or more types of information further include failure modes and predictions, data sheets, monitoring information, simulations, and alerts.

4. The method of claim 3, wherein the digitized representations include one or more of model, life cycle, systems, groups, installation location, equipment information, structure and parts information, documents, instructions, failure modes, alert types, announcements, improvement requests, indicators, component indicators, notifications, work orders, and timeline information.

5. The method of claim 1, wherein the content packages are generated by a template that defines types as semantics and that defines how the semantics are shared.

6. The method of claim 5, wherein semantics for a complexity level are selectively inherited from a parent's complexity level in a tree structure.

7. The method of claim 6, wherein each level includes unique types that are not inherited from a parent and are applicable for a particular level.

8. A device comprising:
one or more processors;
a memory in communication with the one or more processors, the memory having computer-readable instructions stored thereupon which, when executed by the one or more processors, cause the device to perform operations comprising:
receiving a selection indicative of one or more types of information associated with a product or service, wherein the one or more types of information include digitized representations of product information associated with the product or service and wherein the one or more types of information include hierarchical data associated with the product or service, the hierarchical data structured at a plurality of complexity levels;
generating a data container for a content package comprising one or more semantics for populating the content package with the selected one or more types of information, wherein the data container is a data structure of the content package defined by the one or more semantics;
identifying, based on the product or service, one or more recipients for the content package;
sending, to the identified recipients, an announcement indicative of the content package;
receiving, from one or more of the identified recipients, requests for subscriptions to the content package;
populating instances of the container for identified recipients who have subscribed to the content package, wherein the populating comprises populating the content package with the selected one or more types of information based on the one or more semantics; and
sending, to the subscribed recipients, the populated instances of the content package.

9. The device of claim 8, wherein the one or more types of information further include failure modes and predictions, data sheets, monitoring information, simulations, and alerts.

10. The device of claim 9, wherein the digitized representations include one or more of model, life cycle, systems, groups, installation location, equipment information, structure and parts information, documents, instructions, failure modes, alert types, announcements, improvement requests, indicators, component indicators, notifications, work orders, and timeline information.

11. The device of claim 9, wherein the complexity levels comprise one or more of company, classes, subclasses, model, equipment, and spare parts and components.

12. The device of claim 8, wherein the content packages are generated by a template that defines types as semantics and that defines how the semantics are shared.

13. The device of claim 8, wherein semantics for a complexity level are selectively inherited from a parent's complexity level in a tree structure.

14. A non-transitory machine-readable medium storing a program executable by at least one processing unit of a device, the program comprising sets of instructions for:
receiving, by the device, a selection indicative of one or more types of information associated with a product or service, wherein the one or more types of information include digitized representations of product information associated with the product or service and further include hierarchical data associated with the product or service, the hierarchical data structured at a plurality of complexity levels;
generating a data container for a content package comprising one or more semantics for populating the content package with the selected one or more types of information, wherein the data container is a data structure of the content package defined by the one or more semantics;
identifying, based on the product or service, one or more recipients for the content package;
sending, to the identified recipients, an announcement indicative of the content package;
receiving, from one or more of the identified recipients, requests for subscriptions to the content package;
populating instances of the container for identified recipients who have subscribed to the content package, wherein the populating comprises populating the content package with the selected one or more types of information based on the one or more semantics; and
sending, to the subscribed recipients, the populated instances of the content package.

15. The non-transitory machine-readable medium of claim 14, wherein the complexity levels comprise one or more of company, classes, subclasses, model, equipment, and spare parts and components.

16. The non-transitory machine-readable medium of claim 14, wherein the one or more types of information further include failure modes and predictions, data sheets, monitoring information, simulations, alerts.

17. The non-transitory machine-readable medium of claim 16, wherein the digitized representations include one or more of model, life cycle, systems, groups, installation location, equipment information, structure and parts information, documents, instructions, failure modes, alert types, announcements, improvement requests, indicators, component indicators, notifications, work orders, and timeline information.

18. The non-transitory machine-readable medium of claim 14, wherein the content packages are generated by a template that defines types as semantics and that defines how the semantics are shared.

\* \* \* \* \*